United States Patent
Smith (10) Patent No.: US 9,939,323 B2
(45) Date of Patent: Apr. 10, 2018

(54) IR SENSOR WITH INCREASED SURFACE AREA

(71) Applicant: Illinois Tool Works Inc., Glenview, IL (US)

(72) Inventor: Thomas W. Smith, Titusville, FL (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 141 days.

(21) Appl. No.: 13/793,265

(22) Filed: Mar. 11, 2013

(65) Prior Publication Data

US 2014/0183361 A1 Jul. 3, 2014

Related U.S. Application Data

(60) Provisional application No. 61/747,037, filed on Dec. 28, 2012.

(51) Int. Cl.
- *G01J 5/34* (2006.01)
- *G01J 5/04* (2006.01)
- *G01J 5/08* (2006.01)
- *G01J 1/02* (2006.01)

(52) U.S. Cl.
CPC ............... *G01J 5/34* (2013.01); *G01J 1/0266* (2013.01); *G01J 5/045* (2013.01); *G01J 5/0871* (2013.01)

(58) Field of Classification Search
CPC ............... G01J 5/34; G01J 5/00; G01J 5/0022
USPC ....................................................... 250/338.3
See application file for complete search history.

(56) References Cited

U.S. PATENT DOCUMENTS

| | | | | |
|---|---|---|---|---|
| 3,453,432 A | * | 7/1969 | McHenry | G01J 5/34 136/213 |
| 3,829,693 A | * | 8/1974 | Schwarz | 250/338.1 |
| 3,877,308 A | * | 4/1975 | Taylor | 307/400 |
| 4,258,260 A | * | 3/1981 | Obara et al. | 250/338.3 |
| 4,284,888 A | * | 8/1981 | Appleby | 250/338.3 |
| 4,317,063 A | * | 2/1982 | Pedder et al. | 313/388 |
| 4,325,788 A | * | 4/1982 | Snyder | 202/234 |
| 4,336,452 A | * | 6/1982 | Baker | 250/338.3 |
| 4,361,758 A | * | 11/1982 | Rotolo | 250/203.4 |
| 4,475,040 A | | 10/1984 | Matsumoto | |

(Continued)

FOREIGN PATENT DOCUMENTS

| | | | | |
|---|---|---|---|---|
| DE | 4445196 A1 | * | 6/1996 | G01V 8/20 |
| DE | 297 16 880 U1 | | 11/1997 | |

(Continued)

OTHER PUBLICATIONS

David A. Kondas, "Technical Report ARFSD-TR-92024—Introduction to Lead Salt Infrared Detectors" Feb. 1993, 26 pages.

(Continued)

*Primary Examiner* — David Porta
*Assistant Examiner* — Djura Malevic
(74) *Attorney, Agent, or Firm* — Klintworth & Rozenblat IP LLP (57) ABSTRACT

Sensors, systems including sensors, and methods of using such sensors and systems are provided. In one aspect, a sensor includes a sensor element at least partially positioned within the housing. The sensor element includes a plurality of interconnected segments with each segment comprising a pyroelectric crystal and wherein the sensor may generate a single, unitary signal upon exposure of any segment to infrared radiation.

26 Claims, 4 Drawing Sheets

(56) References Cited

U.S. PATENT DOCUMENTS

| | | | |
|---|---|---|---|
| 4,491,727 A | 1/1985 | Appelbaum et al. | |
| 4,616,136 A * | 10/1986 | Ball et al. | 250/338.3 |
| 4,618,854 A * | 10/1986 | Miyake et al. | 340/567 |
| 4,691,104 A * | 9/1987 | Murata et al. | 250/338.3 |
| 4,800,278 A * | 1/1989 | Taniguti et al. | 250/338.1 |
| 4,831,259 A * | 5/1989 | Meixner et al. | 250/353 |
| 4,864,136 A * | 9/1989 | Behlke | 250/338.3 |
| 4,882,491 A * | 11/1989 | Tamura et al. | 250/338.3 |
| 4,912,748 A * | 3/1990 | Horii et al. | 250/221 |
| 4,914,284 A * | 4/1990 | Halldorsson et al. | 250/206.2 |
| 4,914,298 A * | 4/1990 | Quad et al. | 250/349 |
| 4,943,800 A * | 7/1990 | Ikeda et al. | 340/567 |
| 5,045,702 A * | 9/1991 | Mulleer | 250/342 |
| 5,313,060 A * | 5/1994 | Gast et al. | 250/221 |
| 5,420,567 A * | 5/1995 | Schwarz | 340/521 |
| 5,432,350 A * | 7/1995 | Kuritani et al. | 250/338.3 |
| 5,461,231 A * | 10/1995 | Sugimoto et al. | 250/342 |
| 5,574,375 A * | 11/1996 | Nagai | 324/502 |
| 5,589,687 A * | 12/1996 | Kawata et al. | 250/338.3 |
| 5,789,751 A * | 8/1998 | Ma | 250/338.3 |
| 6,049,080 A * | 4/2000 | Ito | 250/338.3 |
| 6,163,025 A * | 12/2000 | Pantus | 250/338.3 |
| 6,294,783 B1 * | 9/2001 | Hayashi | 250/338.3 |
| 6,403,959 B1 * | 6/2002 | Fujikawa et al. | 250/338.3 |
| 6,580,077 B2 * | 6/2003 | Ito et al. | 250/338.3 |
| 7,183,912 B2 * | 2/2007 | Micko | 340/545.3 |
| 7,399,969 B2 * | 7/2008 | Micko | 250/342 |
| 7,399,970 B2 * | 7/2008 | Micko | 250/342 |
| 7,579,595 B2 * | 8/2009 | Micko | 250/338.3 |
| 7,710,546 B2 * | 5/2010 | Akano | 356/4.08 |
| 7,732,770 B2 * | 6/2010 | Han et al. | 250/338.3 |
| 7,755,052 B2 * | 7/2010 | Micko | 250/342 |
| 8,314,390 B2 * | 11/2012 | Micko | 250/338.3 |
| 2009/0302220 A1 * | 12/2009 | Micko | 250/338.3 |
| 2011/0155913 A1 * | 6/2011 | Noguchi et al. | 250/338.3 |
| 2012/0132807 A1 * | 5/2012 | Giebeler et al. | 250/338.3 |
| 2012/0161002 A1 * | 6/2012 | Yoshizaki | 250/338.3 |
| 2012/0161007 A1 * | 6/2012 | Yoshizaki | 250/338.3 |
| 2012/0298867 A1 * | 11/2012 | Nishikawa et al. | 250/338.3 |
| 2013/0105693 A1 * | 5/2013 | Noda | 250/338.3 |

FOREIGN PATENT DOCUMENTS

| | | |
|---|---|---|
| FR | 2 515 818 A1 | 5/1983 |
| JP | S56 60324 | 5/1981 |
| JP | H02 24523 A | 1/1990 |

OTHER PUBLICATIONS

Cal Sensors, Inc., AP-68ME O&M Dwg 61542, 2 pages, published at least as early as Dec. 27, 2012.

Wikipedia, "Lead Selenide" 5 pages, published at least as early as Dec. 27, 2012.

International Search Report and Written Opinion for PCT/US2013/073876 dated Jul. 23, 2014, 6 pages.

* cited by examiner

IR SENSOR WITH INCREASED SURFACE AREA

RELATED APPLICATIONS

The present application claims the benefit of U.S. Provisional Patent Application No. 61/747,037, filed Dec. 28, 2012, the entire contents of which is incorporated herein by reference.

FIELD OF THE INVENTION

The present disclosure generally relates to infrared sensors and, more particularly, to infrared sensors with increased surface area.

BACKGROUND

An infrared (IR) radiation detector responds to thermal energy such as, for example, infrared radiation radiated by objects such as, for example, animals, automobiles, airplanes, gunfire, missiles, explosions, fire, etc. This thermal energy is typically not visible to the human eye. Accordingly, by using an infrared radiation detector, objects that are not visible may be perceived and/or alternative views of visible objects may be obtained.

Materials are known that may be excited by the absorption of infrared energy to provide a useful electrical signal for an infrared radiation detector. Some infrared radiation detectors take advantage of the fact that a change in conductivity occurs in the material when heating with infrared radiation. This change in conductivity is used to modulate a signal impressed across the infrared sensitive material. These infrared radiation detectors are satisfactory for some purposes, but the reaction time in such infrared radiation detectors is inherently long since the operation depends entirely upon a thermal affect.

Another type of infrared radiation detector employs certain materials which operate on the photoconductive principal such that when the material is excited by absorption of infrared energy, there is a change in conductivity in the material. Certain of these photoconductive materials can be used and have very short time constants.

Lead salts provide some of the most sensitive materials for the detection of infrared energy at certain wavelengths and especially lead selenide and lead sulfide materials. An infrared radiation detector utilizing these materials usually comprises a thin film of lead selenide or lead sulfide on a substrate with electrical leads connected to opposite sides of the thin film or layer. The thin film of lead salt can be formed by either vacuum evaporation or deposition onto the substrate or by chemically depositing onto the substrate from a solution.

SUMMARY

The present disclosure is defined by the following claims, and nothing in this section should be taken as a limitation on those claims.

In one aspect, a sensor is provided. The sensor includes, but is not limited to, a sensor element located within the housing, wherein the sensor element includes a plurality of interconnected segments, wherein each segment comprises a pyroelectric crystal, and wherein the sensor generates a single, unitary signal upon exposure of any segment to infrared radiation.

In another aspect, an infrared sensor is provided. The infrared sensor includes, but is not limited to, a housing forming a window, a pyroelectric element located within the housing, wherein the pyroelectric element includes a plurality of interconnected pyroelectric segments, and wherein the plurality of interconnected pyroelectric segments generate a single, unitary signal upon exposure to infrared radiation.

In a further aspect, a system for detecting infrared radiation is provided. The system includes, but is not limited to, a plurality of sensors arranged in a semi-spherical array, wherein each sensor includes a housing forming a window, and a sensor element located within the housing. The sensor element includes a plurality of interconnected segments. The plurality of interconnected segments generate a single, unitary signal upon exposure to infrared radiation.

In still another aspect, a sensor is provided and includes a sensor element including a plurality of interconnected segments. Each segment comprises a pyroelectric crystal and the sensor is adapted to generate a single, unitary signal upon exposure of any segment to infrared radiation.

In still a further aspect, an infrared sensor is provided and includes a housing and a pyroelectric element at least partially positioned within the housing and including a plurality of interconnected pyroelectric segments. The infrared sensor is adapted to generate a single, unitary signal upon exposure of any segment to infrared radiation.

In yet another example, a system for detecting infrared radiation is provided an includes a plurality of sensors arranged in a semi-spherical array. Each sensor includes a housing and a sensor element at least partially positioned within the housing and including a plurality of interconnected segments. The sensor is adapted to generate a single, unitary signal upon exposure of any segment of the sensor to infrared radiation.

BRIEF DESCRIPTION OF THE DRAWINGS

The present invention can be better understood with reference to the following drawings and description. The components in the figures are not necessarily to scale, emphasis instead being placed upon illustrating the principles of the invention.

DETAILED DESCRIPTION

Sometimes, infrared radiation detectors may be arranged in a spherical or semispherical array in order to detect infrared radiation such as, for example, from gunfire. Currently, infrared radiation detectors often use square or rectangular sensor elements 250, shown in FIG. 4 laid over a sensor element 101 of the present disclosure for comparative purposes, to detect infrared radiation housed in a round, can housing. The issue with such a configuration is that since the sensor elements are square and the housing is round, there is a substantial amount of area in which no detection can occur, called dead spots. If infrared radiation falls on a dead spot, little or no detection can occur. As a result, it would be desirable to reduce the amount of dead spots in an array in order to increase the chance of detecting emitted infrared radiation from, for example, a gunshot.

The present disclosure makes use of the discovery that by disposing a sensor element with more than four sides such as, for example, a polygon with more than four sides, or in other cases an elliptical, round, or otherwise arcuately perimetered sensor element, within a housing, then the amount of dead spots can be reduced in an array and the chance of detecting emitted infrared radiation from, for example, a gunshot, can be increased.

Figure 1:
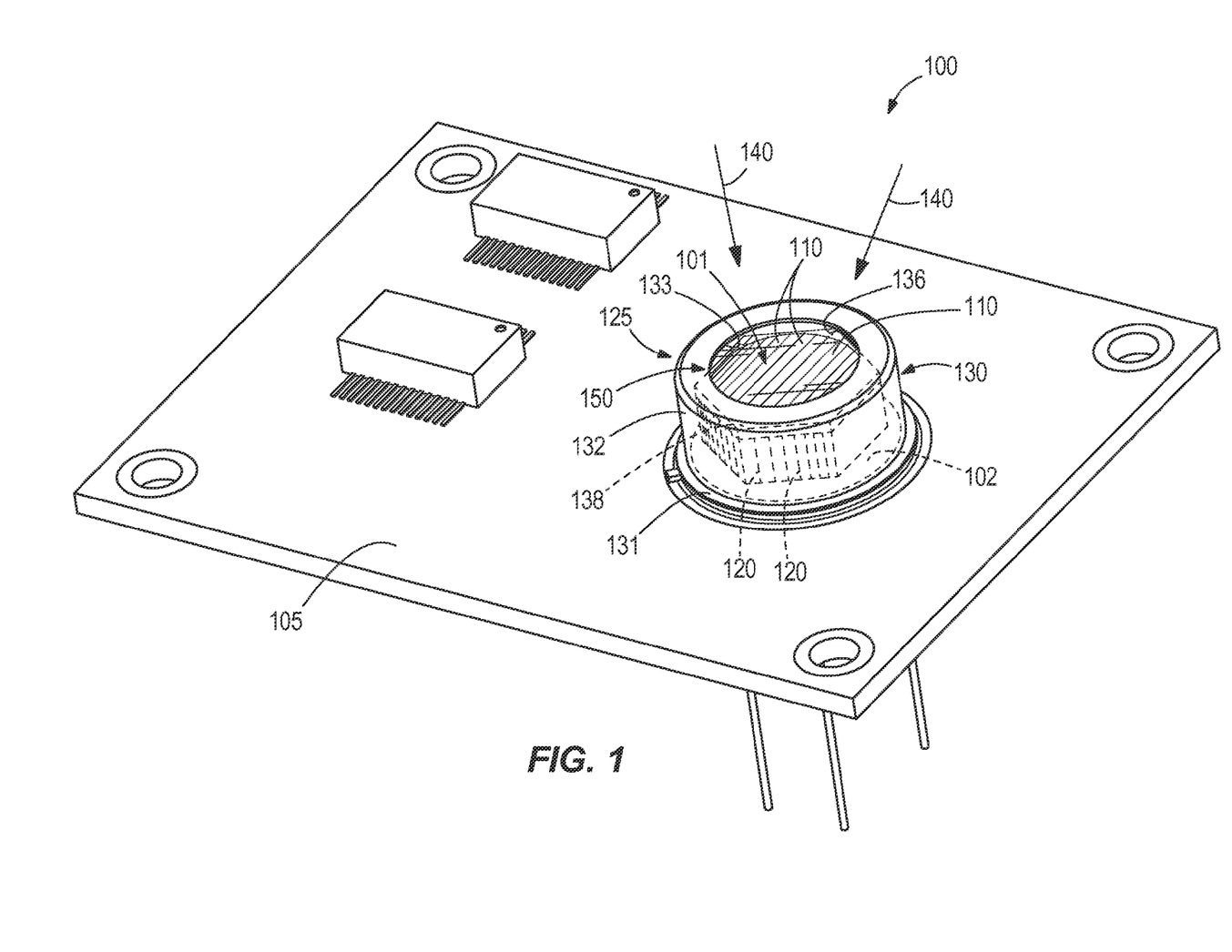
FIG. 1 depicts a perspective view of an exemplary infrared sensor including a sensor element housed within a housing and mounted on a circuit board or integrated circuit (IC) device, in accordance with one embodiment.
Figure 2:
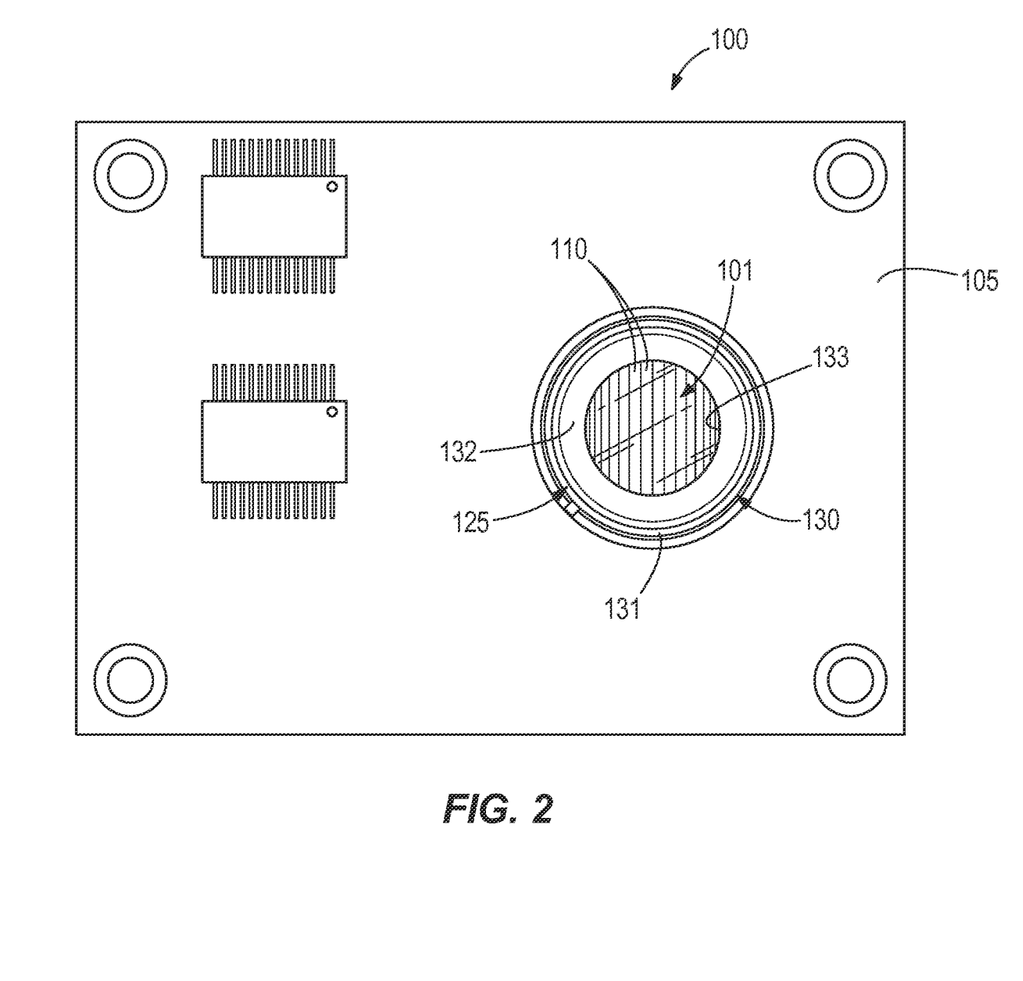
FIG. 2 depicts an overhead view of an infrared sensor having a sensor element housed within a housing and mounted on a circuit board or integrated circuit (IC) device, in accordance with one embodiment.
Figures 5, 6:
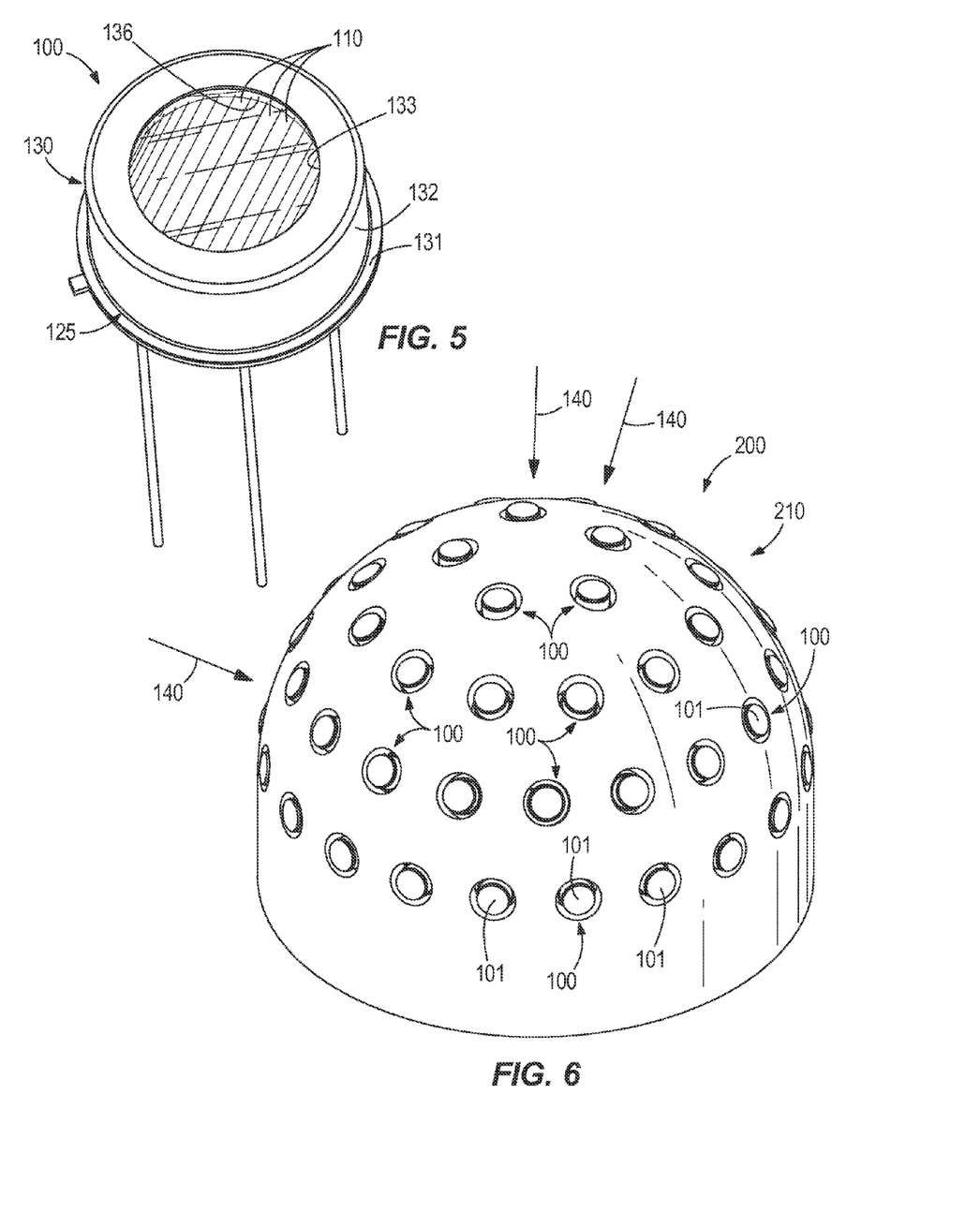
FIG. 5 depicts a perspective view of an infrared sensor having a sensor element housed within a housing, in accordance with one embodiment.
FIG. 6 depicts a detector having an array of infrared sensors, in accordance with one embodiment.

Referring to FIGS. 1, 2, and 5, there is shown an exemplary infrared sensor 100 including a housing 125 and a sensor element 101 positioned within the housing 125. In the illustrated exemplary embodiment, the housing 125 has a can package shape. The infrared sensor 100 is adapted to detect infrared radiation 140 and may be highly sensitive and has a low time constant. With reference to FIG. 6, in one exemplary embodiment, a detector 200 may include a plurality or array 210 of infrared sensors 100 for detection of infrared radiation 140. In some exemplary embodiments, the array 210 of infrared sensors 100 is spherical or semispherical so as to provide a wider field of detection Infrared sensor 100 may be used to detect a variety of sources of infrared radiation 140 such as, for example, fire, explosions, gun shots, missile launches, and the like.

The housing 125 is preferably a metal housing comprised of a metal such as, for example, brass, stainless steel, aluminum, etc. However, the housing 125 may be made from any rigid material and be within the intended spirit and scope of the present invention. In the illustrated exemplary embodiment, the housing 125 is a cylindrically shaped can package 130. The housing 125 includes a stem 131 connected with a cap 132. The housing 125 forms an optical window 133 through which infrared radiation 140 passes. As with the infrared sensor 100 shown in FIG. 1, a lens 150 is mounted outside the housing and over the window 133. The window 133 may be elliptical and/or round so as to have maximum surface area and better mate with the lens 150. Alternatively, the window 133 may be other shapes such as, for example, polygonal with more than four sides or any arcuately perimetered shape. The lens 150 is useful in gathering and focusing the infrared radiation 140 onto the sensor element 101 housed within the housing 125. The lens 150 may be convex so as to gather infrared radiation 140 and focus it onto the sensor element 101.

The sensor element 101 includes any sensor which can be used to detect radiation, and more particularly, infrared radiation. In one exemplary embodiment, the sensor element 101 includes a pyroelectric crystal or a plurality of interconnected pyroelectric crystals, which generate electricity or changes resistance when heated or exposed to infrared radiation 140. A variety of materials may form a pyroelectric crystal including, but not limited to, a lead salt crystal such as Lead Selenide and/or Lead Sulfide (PbS and PbSe), Lithium Tantalate (LiTaO3), Zinc Oxide, Strontium Barium Niobate (SrBaNb2O6), and Ferroelectric materials. The sensor element 101 may include a pyroelectric element or pyroelectric crystal which is sensitive to infrared radiation and generates electricity or changes resistance when exposed to infrared radiation. Infrared radiation is electromagnetic radiation with longer wavelengths than those of visible light, extending from the nominal red edge of the visible spectrum at about 0.7 micrometers (μm) to about 300.0 μm. In some exemplary embodiments, the sensor element 101 is sensitive to infrared radiation with a wavelength of about 0.7 μm to about 25.0 μm. In other exemplary embodiments, the sensor element 101 is sensitive to infrared radiation with a wavelength of about 1.0 μm to about 7.0 μm. In further exemplary embodiments, the sensor element 101 is sensitive to infrared radiation with a wavelength of about 1.0 μm to about 5.5 μm. In some exemplary embodiments, the sensor element 101 is comprised of a material that has very short time constants such as, for example, from about 100 microseconds (μsec) to about 1000 μsec. In other exemplary embodiments, the sensor element 101 is comprised of a material that has very short time constants such as, for example, from about 150 μsec to about 500 μsec.

The infrared sensor 100 includes an integrated circuit (IC) device 102 that includes most of the signal processing circuitry that is adapted to process an output current of the sensor element 101. The infrared sensor 100 includes at least a pair of contacts 136, 138 through which any bias voltage or bias current is directed in order to measure any change in resistance of the sensor element 101, or to receive output current generated by the sensor element 101. In the illustrated exemplary embodiment, the contacts 136, 138 are located adjacent the sensor element 101. However, in other exemplary embodiments, the contacts 136, 138 may be located underneath or above the sensor element 101. The contacts 136, 138 may be made from a highly conductive material such as, for example, gold, silver, copper, or the like, in order to best receive any signal from the sensor element 101, such as output current generated by the sensor element 101 or a bias voltage used to accurately measure any resistance across the sensor element 101. The infrared sensor 100 includes a plurality of interconnects or leads 120 connecting the sensor element 101 with the IC device 102. In the illustrated exemplary embodiment, the IC device 102 is located in the housing 125. Alternatively, the IC device 102 may be positioned in other locations and be within the spirit and scope of the present invention. In some exemplary embodiments, the infrared sensor 100 is connected with a secondary IC device 105 for further processing of any signal from the sensor element 101.

In some exemplary embodiments, the IC device 102 includes a current-voltage conversion circuit, a voltage amplifier circuit, and an output circuit. The current-voltage conversion circuit comprises an operating amplifier in which a feedback capacity (capacitor) is connected between an inverting input port and an output port and a reference voltage is supplied from a non-inverting input port to a power circuit.

Figure 3:
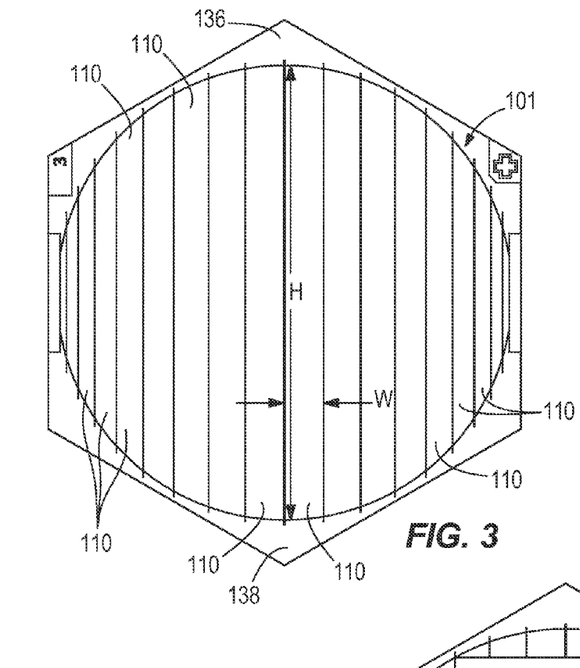
FIG. 3 an overhead view of a sensor element having multiple segments, in accordance with one embodiment.

With reference to FIGS. 1 and 3, the sensor element 101 may be divided into and includes a plurality of interconnected segments 110. Each segment 110 may contain a single pyroelectric crystal. The segments 110 are interconnected, either in series or in parallel, so as to generate a single, unitary signal from the sensor element 101 upon exposure of the sensor element 101 to infrared radiation. For example, if the sensor element 101 generates electricity upon exposure to infrared radiation 140, then the amount of electricity generated by each segment 110 is either added together or divided, based upon whether the pyroelectric segments 110 are connected in series or in parallel, to form a single signal. Conversely, if the sensor element 101 changes resistance upon exposure to infrared radiation 140, then the resistance of each segment 110 is either added together or divided, based upon whether the segments 110 are connected in series or in parallel, to form a single signal. Either way, the sensor element 101 that is divided into and includes a plurality of interconnected segments 110 still generates a single signal, just as if the sensor element 101 contained a single unitary crystal. The single, unitary signal is then analyzed by the IC device 102 in order to measure and detect infrared radiation 140 which has contacted the sensor element 101.

In some exemplary embodiments, each segment 110 may have the same or substantially similar properties such as, for example, a substantially similar resistance value for each segment 110. Thus, when each segment 110 is connected together (e.g., connected in parallel), the resistance would divide by the number of segments 110 to give a base resistance value of the entire sensor element 101. In some exemplary embodiments where each segment 110 has substantially similar properties, such properties are within about ±20% of each other in value. In other exemplary embodiments where each segment 110 has substantially similar properties, such properties are within about ±10% of each other in value. In further exemplary embodiments where each segment 110 has substantially similar properties, such properties are within about ±3% of each other in value.

With particular reference to FIG. 3, the aspect ratio of each segment 110, that is the width W divided by the height H, of any segment 110 may be the same, substantially similar, within about ±25%, within about ±10%, within about ±5%, or within about ±1% of any other segment 110. By maintaining any of these and other aspect ratios between segments 110, each segment 110 would have substantially the same properties such as, for example, a substantially similar resistance value between the sensors. Thus, the segments 110 may be connected in parallel and a signal generated by each segment 110 can then be divided by the total number N of segments 110 to obtain a single, unitary signal from the sensor element 101 that is accurate.

With continued reference to FIG. 3, segments 110 are each different widths W and heights H to allow the aspect ratios of each detector to be substantially similar across all segments 110. In some exemplary embodiments, all segments 110 are connected in parallel in order to form a single sensor element 101 that generates a single, unitary signal. This configuration provides a single infrared sensor 100 including a single sensor element 101 with segmentation between multiple segments 110. Each segment 110 has the same, substantially similar, or constant properties such as, for example, a substantially similar resistance value for each segment 110, so when each segment 110 is connected together (e.g., in parallel), the resistance is divided by the number of segments 110 to give a base resistance value of the entire sensor element 101. For example, if a sensor element 101 has 18 segments 110, with each segment 110 having a resistance value of 18 meg-ohms, the resistance value of the entire sensor element 101 would be the resistance value of one segment 110 (i.e., 18 meg-ohms) divided by the total number of segments (i.e., 18), which equals a resistance value of 1.0 Meg-ohms. 1.0 Meg-ohms happens to be the target resistance value for a square detector. The resistance value for the entire sensor element 101 is substantially similar to the resistance value for a square detector within about ±10%.

In one exemplary embodiment, the segments 110 are formed by ion-milling into a surface of a single sensor element 101, such as a single pyroelectric crystal, to form separate segments 110 with the least amount of removal of material as possible. Removing material from the sensor element 101 reduces the total surface area of the sensor element 101. In some exemplary embodiments, lines of removed material between segments 110 are less than about 20 microns. In other exemplary embodiments, lines of removed material between segments 110 are less than about 10 microns. In further exemplary embodiments, lines of removed material between segments 110 are less than about 7 microns.

In one exemplary embodiment, the geometry of the sensor element 101 matches or approximates the shape of the housing 125 and additionally may match the shape of the optical window 133 in order to maximize the surface area of the sensor element 101 and minimize dead spots. In one exemplary embodiment, the sensor element 101 has more than four sides. In other exemplary embodiments, the sensors element 101 has more than six sides. In further exemplary embodiments, the sensors element 101 has more than ten sides. In still other exemplary embodiments, the sensors element 101 has more than 25 sides. In still further embodiments, the sensor element 101 has infinite sides, or is elliptical and/or round in shape, as shown in FIG. 3.

If the sensor element 101 has more than four sides or more than six sides, the sensor element 101 includes multiple segments 110 in order to allow for a more even distribution of bias across the detector from one contact 136 to an opposing contacting 138. Such even distribution provides for: Little to no difference in output/signal characteristics of the sensor element 101; and little to no change in sensitivity of the sensor element 101 regardless of where a "spot" of radiation, such as infrared radiation, lands on the sensor element 101.

Figure 4:
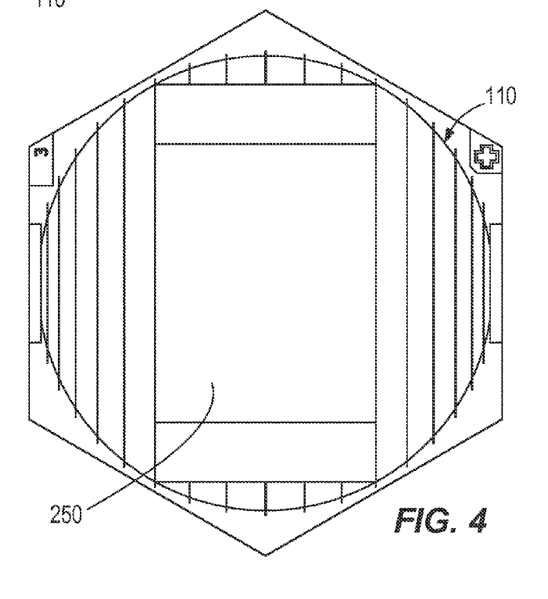
FIG. 4 an overhead view of a sensor element having a single element superimposed over a sensor element having multiple segments, in accordance with one embodiment.

With reference to FIG. 4, a sensor element 101 of the present disclosure is shown with a square or rectangular sensor element 250 positioned over it to illustrated differences between the sensor element 101 and sensor element 250. A sensor element 101 that is round in shape may allow for approximately 3.1 times the active area than a square or rectangular sensor element 250 with the same package or housing. Additionally, a sensor element 101 with more than four sides (i.e. elliptical and/or round) allows for a much wider field of view (FOV) when mounted close to the window 133 of the housing 125. All allowing for building a sensor 100 or an array 210 of sensors with less dead spots.

As utilized herein, the terms "approximately," "about," "substantially," and similar terms are intended to have a broad meaning in harmony with the common and accepted usage by those of ordinary skill in the art to which the subject matter of this disclosure pertains, and in one non-limiting embodiment the terms are defined to be within 10%, in another embodiment within 5%, in another embodiment within 1% and in another embodiment within 0.5%. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable).

Such joining may be achieved with the two members or the two members and any additional intermediate members being integrally formed as a single unitary body with one another or with the two members or the two members and any additional intermediate members being attached to one another. References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. A sensor comprising:
a pyroelectric element including a plurality of interconnected pyroelectric segments, wherein each segment comprises a pyroelectric crystal and two opposing arcuate ends, wherein the plurality of pyroelectric segments are oriented parallel to each other and arcuate ends of the parallel oriented pyroelectric segments cooperate to provide an at least partially arcuate perimeter of the pyroelectric element, wherein each of the plurality of pyroelectric segments includes a width and a height together defining an aspect ratio, wherein the aspect ratios of the plurality of pyroelectric segments are within ±25% of each other, and wherein each of the pyroelectric segments is configured to either generate electricity or change resistance when exposed to infrared radiation, wherein, if the pyroelectric segments generate electricity, the electricity from the pyroelectric segments is configured to be either added or divided to generate a single, unitary signal, and wherein, if the pyroelectric segments change resistance, the resistances of the pyroelectric segments is configured to be either added or divided to generate a single, unitary signal.

2. The sensor of claim 1, further comprising a housing defining a window, wherein the pyroelectric element is at least partially positioned within the housing and at least partially aligned with the window.

3. The sensor of claim 2, wherein the housing has a can package.

4. The sensor of claim 2, further comprising a lens covering the window.

5. The sensor of claim 1, wherein the pyroelectric element is elliptical.

6. The sensor of claim 1, wherein each of the pyroelectric crystals comprises a lead salt crystal.

7. The sensor of claim 1, wherein each pyroelectric segment has a substantially similar resistance value, within about ±20%.

8. The sensor of claim 1, wherein the pyroelectric element is circular.

9. The sensor of claim 1, wherein the pyroelectric element includes at least three interconnected pyroelectric segments.

10. A sensor comprising:
a sensor element including a plurality of interconnected segments, wherein each segment comprises a pyroelectric crystal and at least one arcuate end, wherein the plurality of segments are oriented parallel to each other and arcuate ends of the parallel oriented segments cooperate to provide an at least partially arcuate perimeter of the sensor element, wherein each of the segments is configured to generate electricity when exposed to infrared radiation, wherein the electricity from the segments is configured to be either added or divided to generate a single, unitary signal, and wherein, if the segments change resistance, the resistances of the segments is configured to be either added or divided to generate a single, unitary signal.

11. The sensor of claim 10, wherein the plurality of interconnected segments are oriented parallel to each other and each of the plurality of interconnected segments includes a width and a height together defining an aspect ratio, wherein the aspect ratios of the plurality of interconnected segments are within ±25% of each other.

12. The sensor of claim 10, further comprising a housing defining a window, wherein the sensor element is at least partially positioned within the housing and at least partially aligned with the window.

13. The sensor of claim 12, further comprising a lens covering the window.

14. The sensor of claim 10, wherein the sensor element is elliptical.

15. The sensor of claim 10, wherein each interconnected segment has a substantially similar resistance value, within about ±20%.

16. The sensor of claim 10, wherein each pyroelectric crystal comprises a lead salt crystal.

17. The sensor of claim 10, wherein the pyroelectric element is circular.

18. The sensor of claim 10, wherein the pyroelectric element includes at least three interconnected segments.

19. A sensor comprising:
a sensor element including a plurality of interconnected segments, wherein each segment comprises a pyroelectric crystal and at least one arcuate end, wherein the plurality of segments are oriented parallel to each other and arcuate ends of the parallel oriented segments cooperate to provide an at least partially arcuate perimeter of the sensor element, wherein each of the segments is configured to change resistance when exposed to infrared radiation, wherein the resistances of the segments are configured to be either added or divided to generate a single, unitary signal.

20. The sensor of claim 19, wherein the plurality of interconnected segments are oriented parallel to each other and each of the plurality of interconnected segments includes a width and a height together defining an aspect ratio, wherein the aspect ratios of the plurality of interconnected segments are within ±25% of each other.

21. The sensor of claim 19, further comprising a housing defining a window, wherein the sensor element is at least partially positioned within the housing and at least partially aligned with the window.

22. The sensor of claim 21, further comprising a lens covering the window.

23. The sensor of claim 19, wherein the sensor element is elliptical.

24. The sensor of claim 19, wherein each segment has a substantially similar resistance value, within about ±20%.

25. The sensor of claim 19, wherein the pyroelectric element is circular.

26. The sensor of claim 19, wherein the pyroelectric element includes at least three interconnected segments.

* * * * *